United States Patent [19]

Ross

[11] 4,009,011
[45] Feb. 22, 1977

[54] CAPACITOR DISCHARGE OF LATCHING RELAYS AND ROTARY FILTER

[75] Inventor: Gary T. Ross, Burnsville, Minn.

[73] Assignee: The United States of America as represented by the Secretary of the Army, Washington, D.C.

[22] Filed: Aug. 22, 1975

[21] Appl. No.: 606,825

[52] U.S. Cl. .................................. 55/273; 55/283; 55/290; 55/293; 307/141.4; 318/102; 318/103; 361/166

[51] Int. Cl.[2] ........................................ B01D 46/00

[58] Field of Search .......................... 55/271–273, 55/283, 290, 293; 210/138, 107, 391; 317/139; 318/102, 103; 307/141.4

[56] References Cited

UNITED STATES PATENTS

| | | | |
|---|---|---|---|
| 2,880,819 | 4/1959 | King et al. ............................. | 55/273 |
| 3,175,775 | 3/1965 | Wurtenberg et al. ................ | 55/271 |
| 3,472,002 | 10/1969 | Brown et al. ......................... | 55/290 |
| 3,628,313 | 12/1971 | Broadbent ............................ | 55/283 |

Primary Examiner—Bernard Nozick
Attorney, Agent, or Firm—Peter A. Taucher; John E. McRae; Nathan Edelberg

[57] ABSTRACT

Direct current circuitry for sequentially energizing two or more motors or other load devices, using capacitive discharge to latch in a relay for each load device. During one stage of operation a relatively small voltage is impressed on one lead of a capacitor whose other lead is grounded; a charge is thereby developed in the capacitor. Subsequently a relatively large voltage is impressed on the other lead of the capacitor to direct the charge into the coil of the relay, thereby effecting a relay latching action. The capacitor thereafter isolates the latching circuit from a de-latching circuit; the de-latching circuit is part of a latching circuit for a second relay used to energize a second load device. The invention is particularly useful in sequentially operating electric motors used in self-cleaning engine air cleaners.

2 Claims, 1 Drawing Figure

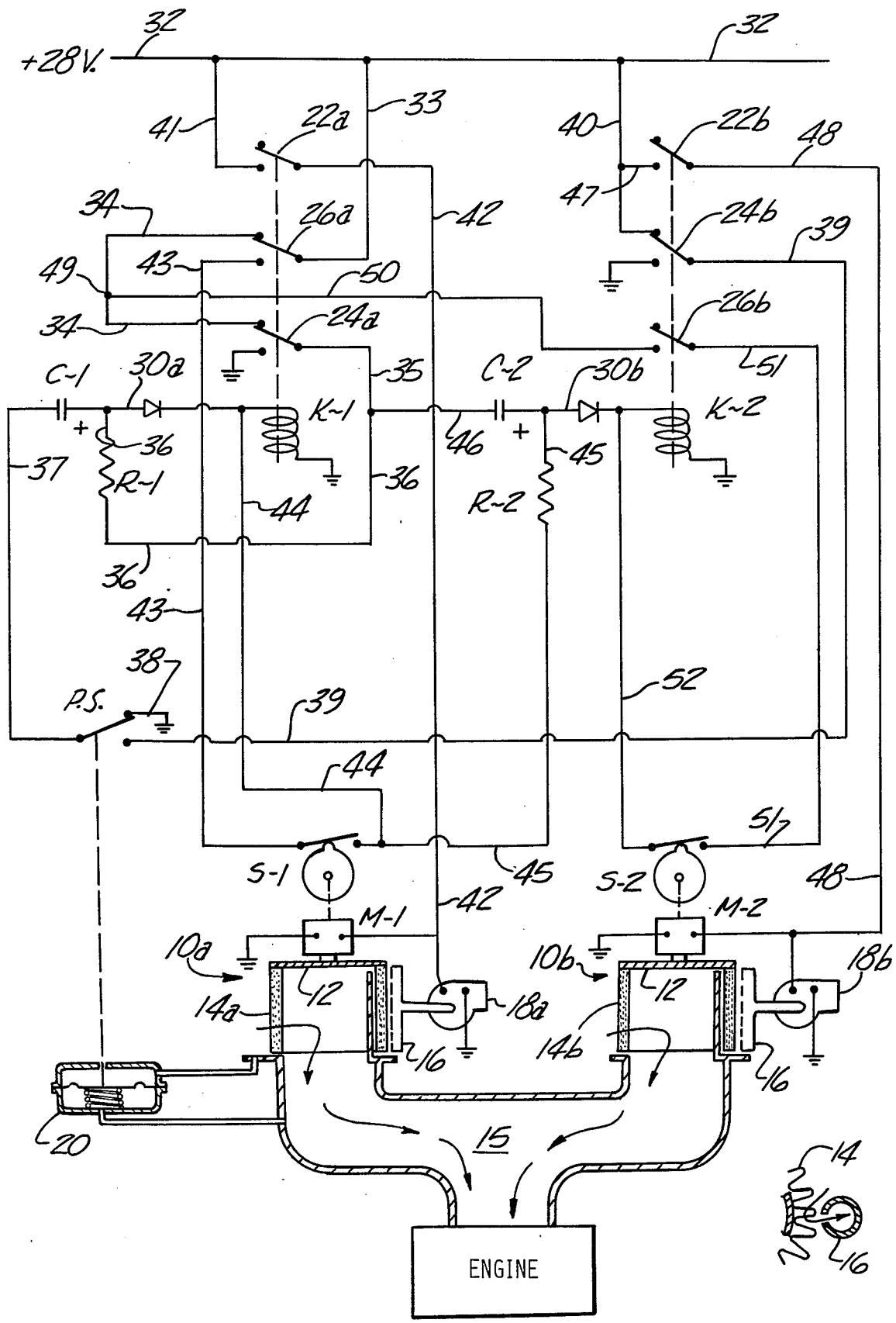

CAPACITOR DISCHARGE OF LATCHING RELAYS AND ROTARY FILTER

The invention described herein was made in the course of a contract between Donaldson Company Inc. and the U.S. Government. Devices embodying this invention may be manufactured or used by or for the Government without payment to the inventor of any royalties thereon.

BACKGROUND AND SUMMARY OF THE INVENTION

Certain engines operating in dusty environments utilize air cleaners of the self-cleaning type. In one arrangement cylindrical cleaner elements are individually and sequentially cleaned by applying a vacuum force or a blowing force to the cleaner element surface; during the cleaning operation either the cleaning nozzle or the cylindrical element is moved in a helical or rotating fashion to cause incremental surface areas of the cleaner element surface to be exposed to the nozzle.

The present invention relates to relatively low cost electric circuitry for controllably energizing the various motors used to perform sequential cleaning of engine air cleaner elements. The circuitry could be used to sequentially operate other load devices.

THE DRAWINGS

The single FIGURE schematically illustrates an engine air cleaning system utilizing control circuitry of the present invention.

AIR CLEANER ENVIRONMENT

The drawings show novel circuitry of the invention associated with a conventional engine air cleaner system comprised of two similar cleaning elements 10a and 10b. Each cleaning element includes a circular disk 12 connected to the shaft of an electric disk rotation motor M-1 or M-2. A cylindrical filter media 14a or 14b is suitably mounted on the disk to clean the air being drawn into the engine intake passage 15.

Periodically the dust accumulations on each filter media 14 are removed by a stationary suction tube 16 suitably connected to an induced draft fan 18a or 18b. The surface of tube 16 exposed to the media surface is provided with a slot or series of perforations that exerts a vacuum force on the dust particles temporarily adhered to the media surface. It will be understood that a media cleaning associated disk rotation motor M-1 or M-2. During "normal run" periods the fan motors and disk rotation motors are de-energized.

Initiation of a media cleaning cycle may be accomplished by a conventional pressure switch 20 having suitable taps to the two zones upstream and downstream from media 14a on air cleaner 10a. When said media is sufficiently plugged to produce an excessive pressure drop across the media the pressure switch moves the controlled contacts P.S. from the illustrated "normal run" position to a "power-on" position; thereby causing the associated circuitry to energize motor M-1 and fan 18a.

Motor M-1 is drivingly connected to a timer switch S-1 so that one or more revolutions of media 14a cause contacts S-1 to open. The associated circuitry is such that opening of contacts S-1 de-energizes motor M-1 (and fan 18a), and energizes motor M-2 (and fan 18b). Motor M-2 is drivingly connected to a timer switch S-2 so that one or more revolutions of media 14b cause contacts S-2 to open, thereby de-energizing motor M-2 (and fan 18b). The motors and fans remain inactivated until pressure switch 20 again senses the need for media cleaning.

The frequency of media cleaning is dependent on the dust content of the ambient atmosphere. When the engine is operating in dusty environments the media will be cleaned more frequently than when the engine is operating in non-dusty environments. The number of air cleaners (10a, 10b, etc.) used in the system is related to the size of the engine and pluggage that can be tolerated.

As shown in the drawing, each filter media 14a or 14b is rotatably mounted, and each air flow device 16 is stationary. If desired, the filter can be stationary, and the air flow device can be rotational; see copending application Ser. No. 487,835 filed July 11, 1974.

ELECTRIC CIRCUITRY

There are shown two similar relay coils K-1 and K-2, each controlling three sets of contacts, designated as power contacts 22a (or 22b), initiator contacts 24a (or 24b), and coil hold-in contacts 26a (or 26b). Each relay coil is energized by discharge of a capacitor C-1 (or C-2) through a connector line 30a (or 30b).

Initial charging of capacitor C-1 is through a high resistance path comprising direct current source 32, line 33, contacts 26a, line 34, initiator contacts 24a, lines 35 and 36, resistance R-1 and line 30a. During the charging period the other terminal of capacitor C-1 is grounded through a circuit comprising line 37, contacts P.S. and line 38. Resistance R-1 is sufficiently large that the capacitor-charging potential in line 30a is insufficient to operate coil K-1.

When pressure switch 20 senses a need for media cleaning it moves switch P.S. down to change line 37 from a grounded condition to a charged condition connected with line 39. A circuit is thereby completed through a low resistance path that comprises source 32, line 40, initiator contacts 24b, line 39, pressure switch contacts P.S., line 37, and the normally grounded terminal of capacitor C-1; that terminal thereby experiences a step voltage change from 0 to 28 volts. The step voltage change causes the charge previously built up in the capacitor to be directed through line 30a into coil K-1, thereby latching the coil and causing the switches 22a, 24a and 26a to assume their non-illustrated positions.

Motor M-1 and fan 18a are energized through a circuit that comprises source 32, line 41, power contacts 22a, and line 42. During operation of motor M-1 the timer switch S-1 is in a circuit-closed condition for holding-in coil K-1. Coil hold-in action is through a circuit that comprises source 32, line 33, contacts 26a, line 43, switch S-1, line 44, and coil K-1.

While timer switch S-1 is in a circuit-closed condition it supplies charging current to capacitor C-2 through a high resistance path that includes line 45, resistance R-2 and line 30b. During this period in the cycle the other terminal of capacitor C-2 is grounded through a connection that includes lines 46 and 35, and switch 24a.

When switch S-1 times out (i.e. opens its contacts) the hold-in circuit for coil K-1 is broken. Accordingly switches 22a, 24a and 26a assume their illustrated positions. Motor M-1 and fan 18a are deactivated at 22a. Also, the charged capacitor C-2 is subjected to 28 volt potential through a circuit that comprises source 32, line 33, switch 26a, line 34, switch 24a, and lines 35 and 46. The step voltage change in line 46 from 0 to 28 volts produces a corresponding voltage rise in line 30b. Capacitor C-2 thereby discharges into the relay coil K-2 to latch same into the energized state.

In the energized state of coil K-2 the switches 22b, 24b, and 26b assume their non-illustrated positions. Motor M-2 and fan 18b are energized through a circuit comprising source 32, lines 40 and 47, contacts 22b, and line 48. When energized, Motor M-2 operates timer switch S-2 to its circuit-closed condition.

Relay coil K-2 is held-in by means of a circuit that comprises source 32, line 33, switch 26a, line 34, connection point 49, line 50, switch 26b, line 51, switch S-2, line 52, and coil K-2.

When timer switch S-2 times out coil K-2 is de-energized so that switches 22b, 24b and 26b assume their illustrated positions preparatory to the next media cleaning cycle initiated by pressure switch 20. During the intervening "normal run" period capacitor C-1 is maintained in a charged condition through the high resistance path containing resistance R-1; capacitor C-2 is in a discharged condition until timer switch S-1 completes the high resistance circuit through resistance R-2. Resistance R-1 and R-2 are selected to produce relatively large voltage drops thereacross, e.g. 27 volts; the capacitor charging voltage is thereby about one volt, which is insufficient to operate the relay coil K-1 or K-2. Relay actuation is accomplished only by capacitor discharge caused by the relatively large step voltage increases in line 37 or 46.

If the pressure switch remains activated after cleaning both elements (severe plugging), M-1 will again start because the step change normally produced by the pressure switch to latch K-1 will not be produced at contacts 24b via line 39. This will yield continuous sequential operation.

Capacitor C-1 isolates the latching circuit (line 37) from the de-latching circuit (switch S-1). The associated relay coil K-1 can be made to de-latch regardless of the potential in the latching circuit. In this invention the de-latch action on one coil K-1 acts to simultaneously latch the other coil K-2. This accomplishes sequential operation of the load devices connected to lines 42 and 48.

The novel circuitry is particularly useful for sequentially operating motors in a self-cleaning engine air cleaner system. However the circuitry could be used to sequentially operate other load devices.

I wish it to be understood that I do not desire to be limited to the exact details of construction shown and described for obvious modifications will occur to a person skilled in the art.

I claim:

1. Circuitry for sequentially energizing first and second load devices from a direct current source, comprising:

a first relay coil (K-1) electrically associated with the first load device, and a second relay coil (K-2) electrically associated with the second load device;

first power contacts (22a) controlled by said coil (K-1) connecting the first load device to the current source only when said first coil (K-1) is energized; second power contacts (22b) controlled by said second coil (K-2) connecting the second load device to the current source only when said second coil (K-2) is energized;

means for energizing the first relay coil comprising a first capacitor (C-1) having one of its leads normally connected to ground at 38 and its other lead connected to the first relay coil, a first interruptable high resistance path including a switch (33) (34) (35) connecting the current source to the other capacitor lead only when the first relay coil is de-energized whereby the first capacitor is charged without operating the coil, a first interruptable low resistance path including a switch (40) (39) connected to the current source, and cycle-initiating switch means (P.S.) operable to disconnect the ground and connect said one capacitor lead to said low resistance path whereby a relatively large voltage is then impressed on said one capacitor lead to thus cause the capacitor to energize the first relay coil (K-1);

means for energizing the second relay coil (K-2) comprising a second capacitor (C-2) having one of its leads connected to ground through relay contacts (24a) only when relay coil (K-1) is energized, said second capacitor having its other lead connected to the second relay coil (K-2), a second interruptable high resistance path including a switch (33) (43) (45) supplying current from the aforementioned source to said other lead of the second capacitor only when the first relay coil (K-1) is energized, a second interruptable low resistance current path including a switch (33) (34) (46) connecting the current source to said one lead of the second capacitor only when the first relay coil is de-energized, a timer switch (S-1) operable to de-energize said first relay coil (K-1) and thereby enable a relatively large voltage to be impressed through the second low resistance path onto said one lead of the second capacitor, whereby that capacitor energizes the second coil.

2. The circuitry of claim 1: each load device comprising motor means moving an air filter media cylinder relative to a media-cleaning nozzle, whereby the nozzle removes dust accumulations from the cylinder when the motor means is operating;

the aforementioned cycle-initiating switch means (P.S.) comprising a pressure switch actuated by aerodynamic pressure drop through the media in one of the cylinders;

the first high resistance path including relay contacts (26a) arranged to hold-in the first coil (K-1) after its initial energization, and relay contacts (24a) arranged to interrupt the first high resistance path while said first coil (K-1) is energized;

the first low resistance path including relay contacts (24b) arranged to interrupt the first low resistance path while coil (K-2) is energized;

the second high resistance path including the aforementioned relay contacts (26a) and timer (S-1);

the second low resistance path including relay contacts (26a) and (24a).

* * * * *